(12) United States Patent
Ghosh et al.

(10) Patent No.: US 7,181,768 B1
(45) Date of Patent: Feb. 20, 2007

(54) COMPUTER INTRUSION DETECTION SYSTEM AND METHOD BASED ON APPLICATION MONITORING

(75) Inventors: Anup K. Ghosh, Fairfax, VA (US); Michael Schatz, Sterling, VA (US); Christoph C. Michael, Reston, VA (US); Aaron Schwartzbard, Reston, VA (US)

(73) Assignee: Cigital, Dulles, VA (US)

( * ) Notice: Subject to any disclaimer, the term of this patent is extended or adjusted under 35 U.S.C. 154(b) by 777 days.

(21) Appl. No.: 09/698,159

(22) Filed: Oct. 30, 2000

Related U.S. Application Data

(60) Provisional application No. 60/161,914, filed on Oct. 28, 1999.

(51) Int. Cl.
*G06F 19/00* (2006.01)
(52) U.S. Cl. .......................................... 726/23; 706/25
(58) Field of Classification Search ................ 709/224; 713/200, 201; 714/57; 726/23; 706/15, 706/21, 23
See application file for complete search history.

(56) References Cited

U.S. PATENT DOCUMENTS

| | | | |
|---|---|---|---|
| 6,289,462 B1 * | 9/2001 | McNabb et al. ............. 713/201 |
| 6,347,374 B1 * | 2/2002 | Drake et al. ................ 713/200 |
| 6,405,318 B1 * | 6/2002 | Rowland .................... 713/200 |
| 6,442,694 B1 * | 8/2002 | Bergman et al. ............ 713/201 |
| 6,681,331 B1 * | 1/2004 | Munson et al. ............. 713/201 |
| 6,769,066 B1 * | 7/2004 | Botros et al. ................. 726/23 |
| 6,839,850 B1 * | 1/2005 | Campbell et al. ........... 713/201 |

* cited by examiner

*Primary Examiner*—Nasser Moazzami
*Assistant Examiner*—Ellen C. Tran
(74) *Attorney, Agent, or Firm*—Paul Hastings, Janolsky & Walker LLP

(57) ABSTRACT

An intrusion detection system (IDS) that uses application monitors for detecting application-based attacks against computer systems. The IDS implements application monitors in the form of a software program to learn and monitor the behavior of system programs in order to detect attacks against computer hosts. The application monitors implement machine learning algorithms to provide a mechanism for learning from previously observed behavior in order to recognize future attacks that it has not seen before. The application monitors include temporal locality algorithms to increased the accuracy of the IDS. The IDS of the present invention may comprise a string-matching program, a neural network, or a time series prediction algorithm for learning normal application behavior and for detecting anomalies.

24 Claims, 6 Drawing Sheets

COMPUTER INTRUSION DETECTION SYSTEM AND METHOD BASED ON APPLICATION MONITORING

This application claims the benefit of U.S. Provisional Application No. 60/161,914, filed Oct. 28, 1999, which is herein incorporated by reference in its entirety.

The U.S. Government has a paid-up license in this invention and the right in limited circumstances to require the patent owner to license others in reasonable terms as provided for by the terms of Contract Nos. DAAH01-97-C-R095; DAAH01-98-C-R145 and F30602-97-C-0117, each awarded by the Defense Advanced Research Projects Agency (DARPA).

BACKGROUND

1. Field of the Invention

The present invention relates to computer intrusion detection systems, and more particularly to intrusion detection systems based on application monitoring to identify known and novel attacks on a computer system.

2. Background of the Invention

Intrusion detection systems ("IDSs") generally take advantage of the extensive auditing capabilities inherent in many computer operating systems and other auditing facilities which may be added to a computer system. Such auditing systems can generate logs that capture every event that occurs during the operation of the computer, or may be configured to capture only a subset of information concerning specified events. The logs are examined, using manual or automated techniques, to identify possible intrusive activity. Most modern day operating systems provide the means for capturing a particular user's or process's instructions to the computer operating system, thereby allowing for full accountability for access to the computer's resources. Such captured instructions include, for example, all system calls made by an application, all object requests made by an application, and information related to the individual processes spawned by the application. Operating systems providing such auditing facilities are well-known in the art, and are commonly referred to as C2 systems. More information on auditing facilities and requirements can be found in *Trusted Computer Systems Evaluation Criteria* (also known as the "Orange Book"), published by the National Computer Security Center. For the Linux operating system and other variants of the well-known UNIX operating system, the well-known trace program logs system calls made by processes running on the computer, as well as the results of those system calls. For Sun Microsystem's well-known Solaris operating system, the Basic Security Module ("BSM") produces an "event" record for individual processes, and can log over 200 events, including system instructions issued by each process. For Microsoft's well-known Windows NT operating system, base object auditing provides analogous auditing of a process's access to system resources. That is, whenever an object is requested or accessed by a process, the audit log records the transaction. Other operating systems provide similar audit capabilities. Even when such facilities are not integral to the operating system, a suitable auditing system for gathering data regarding a user's or application's use or interaction with the computer system's resources can be written and implemented according to techniques well-known in the art.

In the computer security arts, two basic strategies have been used in designing and implementing IDSs. In early systems, the basic strategy was to monitor the activities of the computer system's users to identify instances of intrusive user behavior. In such IDSs the goal was to identify user behavior indicating an attack on the system. Activities such as super user login attempts, transfers of sensitive files, or failed file access attempts were flags for potential intrusive activity. One example of such a user-oriented IDS is the Intrusion Detection Expert System ("IDES") developed by Stanford Research International, as described by T. F. Lunt, "A Survey of Intrusion Detection Techniques," in *Computers and Security*, Volume 12, 1993, pp. 405–418. Other examples are described by T. Lane and C. E. Brodley, "An Application of Machine Learning to Anomaly Detection," in *Proceedings of the 20th National Information Systems Security Conference*, October, 1997, pages 366–377. Lane and Brodley first build user profiles based on sequences of each user's normal command executions, then they attempt to detect an intruder based on deviations from the user's established profile. Similarly, D. Endler, "Intrusion Detection: Applying Machine Learning to Solaris Audit Data," in *Proceedings of the 1998 Annual Computer Security Applications Conference* (ACSAC '98), December, 1998, Scottsdale, Ariz., pp. 268–279, describes using neural networks to learn users' behavior based on Sun Solaris BSM events recorded from user actions. A drawback to such user-based IDS is that a user may slowly change his or her behavior to skew the profiling system such that intrusive behavior is deemed normal for that user. Moreover, user-based IDSs raise privacy concerns for users in that such a surveillance system monitors users' every move.

More recently, the focus has changed to monitoring the behavior of applications running on the computer. Such IDSs are based on the concept that every intrusion is, by definition, an unauthorized use or attempt to use the computer's resources using various computer applications. Application-based IDSs are described in more detail below. First, however, a brief discussion of general intrusion detection techniques is presented below.

In addition to being categorized according to the area of focus, i.e., user versus application, IDSs are also categorized according to the way intrusive behavior is identified. In one approach, the IDS analyzes computer audit logs looking for specific patterns corresponding to known attack signatures. This string-matching approach to intrusion detection is known as "misuse detection." Misuse detection systems are described by J. Cannady, "Artificial Neural Networks for Misuse Detection," in *Proceedings of the 21st National Information Systems Security Conference*, Oct. 5–8, 1998, pp. 443–456. An advantage of misuse detection systems is that such systems have a low false alarm rate. That is, if the system labels a behavior as intrusive, there is a high probability that an attack is present. Moreover, because a misuse IDS looks for known attacks, if an attack is detected, the exact nature of the attack is also identified. While misuse systems provide a fairly reliable way of detecting known attacks against systems, they can have a high false positive rate. That is, when even slight variations of known attacks are encountered, a misuse detection system will likely mislabel the behavior as normal. Unless an identical match to the previously stored signature is made, the attacker is likely to avoid detection. Because known attack signatures can be varied in countless ways, this makes detection of even known attacks a daunting problem. Moreover, a misuse detection approach cannot detect novel attacks against systems, of which there are new ones developed on a continual basis.

A second approach to identifying intrusive behavior is known as "anomaly detection." In this approach, the normal operating characteristics of users or applications are observed to develop profiles reflective of normal behavior. The IDS then compares subsequent computer audit logs of user or application behavior with their associated profiles to determine whether or not the subsequent behavior has deviated from normal behavior. An advantage of an anomaly detection approach is the ability to detect novel attacks against the computer. However, a disadvantage of anomaly detection systems is their inability to identify the exact nature of the attack. An anomaly detection system can only detect that the behavior observed is unusual, such as might constitute an attack, but cannot identify the attack. Moreover, anomaly detection systems have been prone to excessive false positive identifications because any departure from normal operations is flagged as a possible attack, as discussed below.

In state-of-the-art anomaly detection systems, an equality matching (also referred to herein as "string-matching") algorithm is used to identify anomalies. Equality matching algorithms compare, on a string-by-string basis, currently observed application behavior against a table of previously recorded normal behavior for that application. If a match is made for a string it is considered normal behavior. Otherwise an anomaly counter is increased. A drawback, however, to using an equality matching algorithm for intrusion detection is the inability to generalize from past observed behavior. That is, if the behavior currently observed during monitoring is not an exact match with the previously recorded behavior, then an anomaly is recorded. Equality matching techniques do not, by themselves, use any notion of similarity to determine if currently observed behavior is sufficiently close enough to previously recorded behavior to warrant not recording an anomaly. For this reason, equality matching anomaly detection systems have traditionally had a high false alarm rate. That is, they tend to send up false warnings of intrusions, therefore providing diminishing utility for the end user.

Two of the more prominent efforts in the prior art to solve these problems are summarized below. The IDSs described are application monitoring systems directed to anomaly detection based on known behavior of computer applications.

University of New Mexico

A research group at the University of New Mexico ("UNM") implemented string-matching algorithms in a system capturing short sequences of system calls to build profiles of behavior for various applications, as described by S. Forrest, S. A. Hofmeyr, and A. Somayaji, "Computer Immunology," in *Communications of the ACM*, Volume 40, No. 10, October, 1997, pp. 88–9, and by S. Forrest, S. A. Hofmeyr, A. Somayaji, and T. A. Longstaff, "A Sense of Self for Unix Processes," in *Proceedings of the 1996 IEEE Symposium on Security and Privacy*, Oakland, Calif., May, 1996, pp. 120–128. The UNM group stored the profiles in tables representing the normal behavior for each application monitored. During online testing or deployment, short sequences of system calls made by each application were captured and compared with the associated table of normal behavior. If a particular sequence of system calls captured during the online operation of the application does not match any string in the application's associated table, an anomaly is recorded.

If the number of anomalies detected is a significant percentage of the overall number of short sequences captured during the online session, then the application's behavior is labeled intrusive. A problem with this technique is that actual intrusive behavior will tend to be washed out over time due to the occurrence of "noise." Noise is caused by the normal variability to be expected in an application's behavior, and yet results in an anomaly being recorded. Noise tends to occur randomly throughout the application's execution, whereas actual intrusions result in concentrated occurrences of anomalies. Accordingly, a high percentage of noise during an application's execution can mask the intrusive behavior.

Iowa State University

A group from Iowa State University ("ISU") has implemented an application-based intrusion detection system that analyzes system calls using state machine models of application behavior, as described in R. Sekar, Y. Cai, and M. Segal, "A Specification-Based Approach for Building Survivable Systems," in *Proceedings of the 21st National Information Systems Security Conference* (NISSC '98), Oct. 5–8, 1998, pp. 338–347. However, their approach is not concerned with detecting anomalies, as much as detecting violations of specified behavior. As a result, the approach of the ISU group requires the development of specification models for acceptable program behavior. Unfortunately, deriving specification models by hand can be quite a difficult process and is not scalable to the number of programs that need to be specified.

As discussed previously, prior IDSs have employed neural networks to build user profiles based on sequences of commands entered by users. These user-based IDSs were implemented using feed-forward multi-layer perceptron networks, also known as "backpropogation neural networks" or simply "backprops." The backprop is trained to recognize patterns of normal user behavior. After the training, the backprop is used to identify intruders based on deviations from the established user patterns. However, because of the complexities in establishing adequate learning criteria and other problems discussed herein, neural networks have heretofore not been implemented in application-based intrusion detection systems.

SUMMARY OF THE INVENTION

The present invention provides a class of intrusion detection systems and methods based on application monitoring using machine learning techniques providing reduced false positive and false negative rates. The present invention comprises two aspects of improved IDSs based on application monitoring. In a first aspect, the present invention provides an improved system and method for anomaly detection using a string-matching algorithm in combination with a temporal locality algorithm. In this aspect of the present invention, the parameters of the string-matching algorithm and the temporal locality algorithm may be advantageously adjusted to accommodate the unique nature of the application being monitored, thereby reducing the IDS's false negative rate without unacceptable increases in the false positive rate.

A second aspect of the present invention provides an improved system and method for both anomaly detection and misuse detection using time series prediction on audit data in combination with a temporal locality algorithm. The time series prediction may be carried out using any suitable method, such as, for example, artificial neural networks, Bayesian networks, or finite automata.

In one embodiment, a plurality of exemplar strings are used to encode data collected during the execution of an application to be monitored, wherein a distance vector between the exemplar string and the collected data is calculated to determine a corresponding input data for a backprop network. The backprop comprises an input layer, a single hidden layer and an output layer, wherein: the input layer comprises a plurality of input nodes, wherein each input node corresponds to one of the exemplar strings; the hidden layer comprises a plurality of hidden nodes, wherein the number of hidden nodes is determined by a selection process; and wherein the output layer comprises at least one output node. In a preferred embodiment, the temporal locality algorithm counts the number of anomalous or misuse behaviors encountered over time and slowly decrements the counter, whereby clusters, i.e., concentrated incidences, of encountered behavior have a greater weight in the counter process.

For anomaly detection purposes, the backprop is trained to learn normal behavior for a particular application to be monitored. The trained network is then used to detect possibly intrusive behavior by identifying significant anomalies, i.e., concentrated differences between the application's normal operating behavior and the behavior observed. Similarly, for misuse detection purposes, the backprop is trained to learn the behavior of the application when various known attacks are implemented. In this aspect, the observed application behavior is input to the trained neural network to identify significant similarities between the observed behavior and the known malicious behavior. The neural networks can generalize from past observed behavior to recognize similar future behavior.

In a preferred embodiment of the present invention, a recurrent neural network is used in combination with a temporal locality algorithm to provide an improved system and method for anomaly detection based on application monitoring. In this embodiment, the neural network comprises an input layer, a single hidden layer, an output layer, and a plurality of context nodes, wherein: the input layer comprises a plurality of input nodes, wherein each input node corresponds to a data mapping for the system instructions; the hidden layer comprises a plurality of hidden nodes, wherein the number of hidden nodes is determined by a selection process; and wherein the output layer comprises a plurality of output nodes corresponding to a segment of system instructions.

DETAILED DESCRIPTION OF THE INVENTION

Figure 1A:
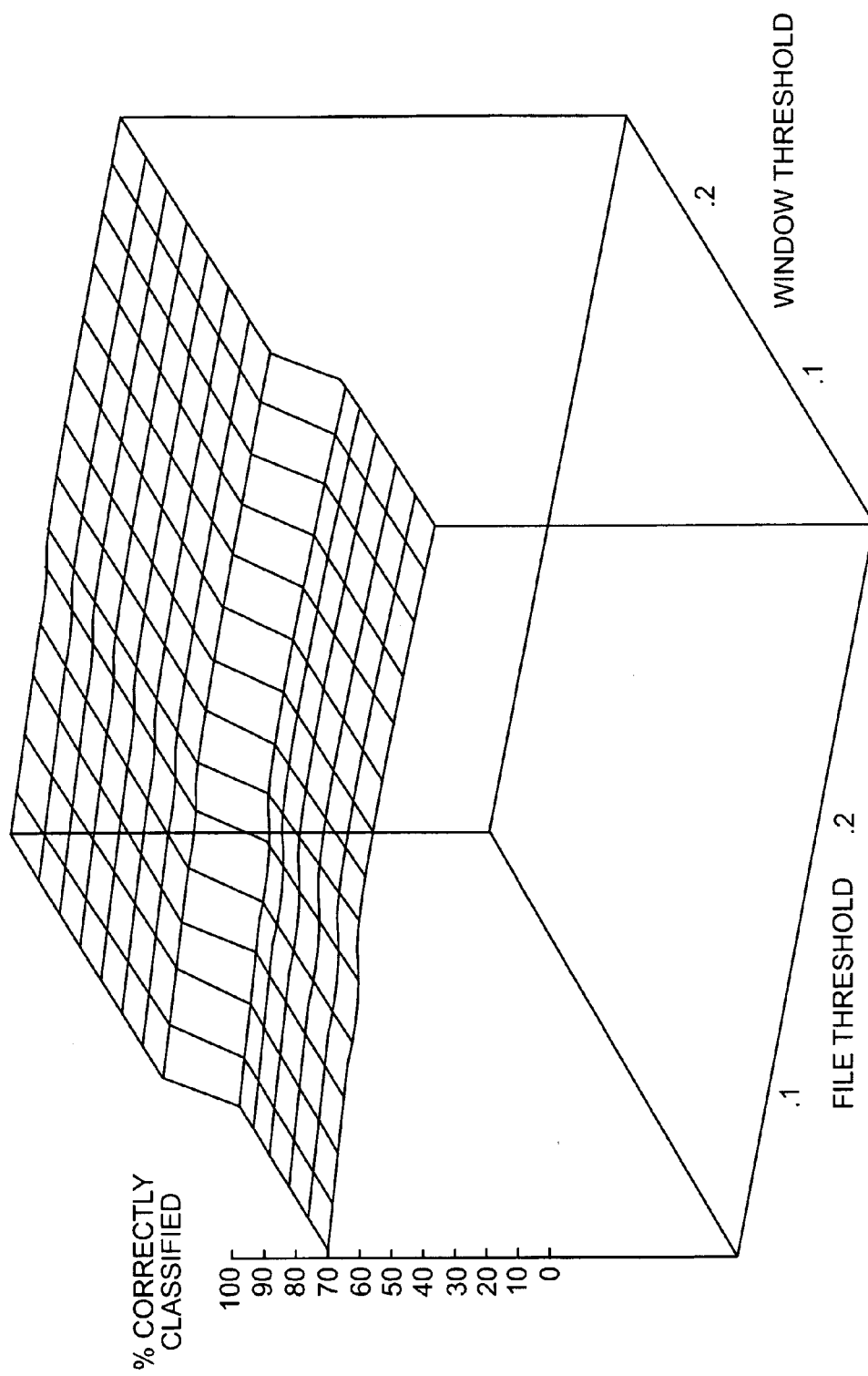
FIGS. 1A and 1B are three-dimensional plots of showing the affect the various tunable parameters have on an intrusion detection according to the first aspect of the present invention.

As discussed above, the present invention comprises three aspects. In a first aspect, anomaly detection is implemented using a string-matching algorithm which can be tuned to reduce the rate of false-positive identifications. In the second aspect, the present invention uses a neural network to provide both misuse and anomaly detection systems. In a third aspect, a time series prediction system is implemented to detect anomalous behavior in an application.

A. IDS Using String-Matching Algorithm in Combination with Temporal Locality Algorithm This aspect of the present invention comprises an IDS using a string-matching algorithm in combination with a temporal locality algorithm. In the preferred embodiment, this aspect of the present invention comprises a data collection and pre-processing phase and a monitoring phase, as described below.

Data Collection and Pre-Processing Phase

As discussed above, operating systems typically comprise auditing facilities which generate one or more sets of audit logs. Such auditing facilities are used in this embodiment of the present invention to collect the application data described herein. The exact format of the audit logs, per se, is not important to the present invention. What is important is that the logs comprise a sequential listing of system instructions passed from the application to the operating system during normal operation for each application being monitored. That is, an application profile (also referred to herein as a "model application profile") is developed for each application being monitored. Because applications may spawn more than one process, the sequence of events should identify the individual process identification ("pid") issuing the instructions. The amount of data collected is dependent upon the nature of the application being monitored. In an actual implementation of this embodiment, three weeks of application data was collected.

In most cases, the audit logs will require some pre-processing to parse system calls or object requests made by each application. To reduce disk space requirements, a database or file is constructed by creating N-gram tables, for a given N-gram size. As used herein, an N-gram is a data string comprising a sequential mapping of N instructions passed from an application to the computer operators. That is, an N-gram represents a sequence of N consecutive system instructions issued by any processes invoked by the application. The total number of possible N-grams is dependent upon the total number of possible system instructions available in a particular operating system. For example, in the Solaris operating system, there are over 200 different BSM instructions which an application may generate. Accordingly, a single N-gram can have well over $200^N$ possible combinations. In practice, however, an application will normally issue only about 10 to 20 different system instructions, reducing the number of N-grams observed to between about $10^N$ and $20^N$.

The database lists every unique N-gram that occurred during the application's execution, as well as the frequency of occurrence. For example, suppose a given application yields the following sequence of events:

[pid 1] A; [pid 2] B; [pid 2] C; [pid 1] D; [pid 1] B; [pid 2] A; [pid 1] D; [pid 1] B; [pid 2] E; [pid 2] B; [pid 2] D, where [pid 1] and [pid 2] are the process IDs for two processes spawned during execution of the application, and A, B, C, D, and E represent the various system instructions made by the application. The first step is to separate the data according to individual pids:

[pid 1]A B D B D B; and

[pid 2] C A E B D.

The next step is to build the database table or file. In this case, an N-gram size of two would result in a database table as shown in Table 1. As shown in Table 1, the total number of unique 2-grams is six, and the total number 2-grams is nine.

TABLE 1

| 2-grams Identified | Frequency |
|---|---|
| AB | 1 |
| BD | 3 |
| DB | 2 |
| CA | 1 |
| AE | 1 |
| EB | 1 |

Similarly, for an N-gram size of three, the database table would be as shown in Table 2. In this case, there are six unique 3-grams and only seven total 3-grams.

TABLE 2

| 3-grams Identified | Frequency |
|---|---|
| ABD | 1 |
| BDB | 2 |
| DBD | 1 |
| CAE | 1 |
| AEB | 1 |
| EBD | 1 |

The size of the N-gram, i.e., the number of instructions comprising the data string, may be varied to accommodate a particular application. In the preferred embodiment, the number of instructions is a single data string is six.

Application Monitoring Phase

Once the model application profile for each application is made, the IDS is ready for use to detect intrusions in an operational environment. Audit data is collected during a session to be monitored, and the system instructions issued by any applications run during the session are parsed out as described above. Whatever data string size (i.e., the value of N) was used to create the original application profiles is used to create application profiles for the session. Each application profile is subdivided into a plurality of segments of data strings. Each segment has a pre-defined length, i.e., a pre-defined number of data strings will be in each segment. Accordingly, for a given session, there are three levels of granularity: a session, which is made up of a plurality of application profiles, which are each made up of a plurality of segments, which in turn are made up of a pre-determined number of data strings. The IDS works as follows:

For each application in the session, the data strings are compared, in the order they were generated, with the associated model application profile. For each segment, a data string counter tracks the number of data strings that are not found in the model profile for the application. If the ratio of such data strings to the total number of data strings in a segment exceeds a pre-determined data string threshold, the segment is labeled anomalous. Similarly, for each anomalous segment in an application profile for a session, a segment counter is incremented. If the ratio of the number of anomalous segments to the total number of segments in the application profile exceeds a segment threshold, the application is labeled anomalous and an application counter is incremented. This process is repeated for each application profile in the session. The session will be labeled intrusive if one of two events occur. First, if the ratio of anomalous applications in the session to the total number of applications in the session exceeds a session threshold, the session is labeled intrusive. Additionally, if any single application is highly anomalous, the entire session is labeled intrusive. Accordingly, for any application, if the ratio of the number of anomalous segments to the total number of segments in the application profile exceeds an application threshold, the session is labeled intrusive.

Figure 1B:
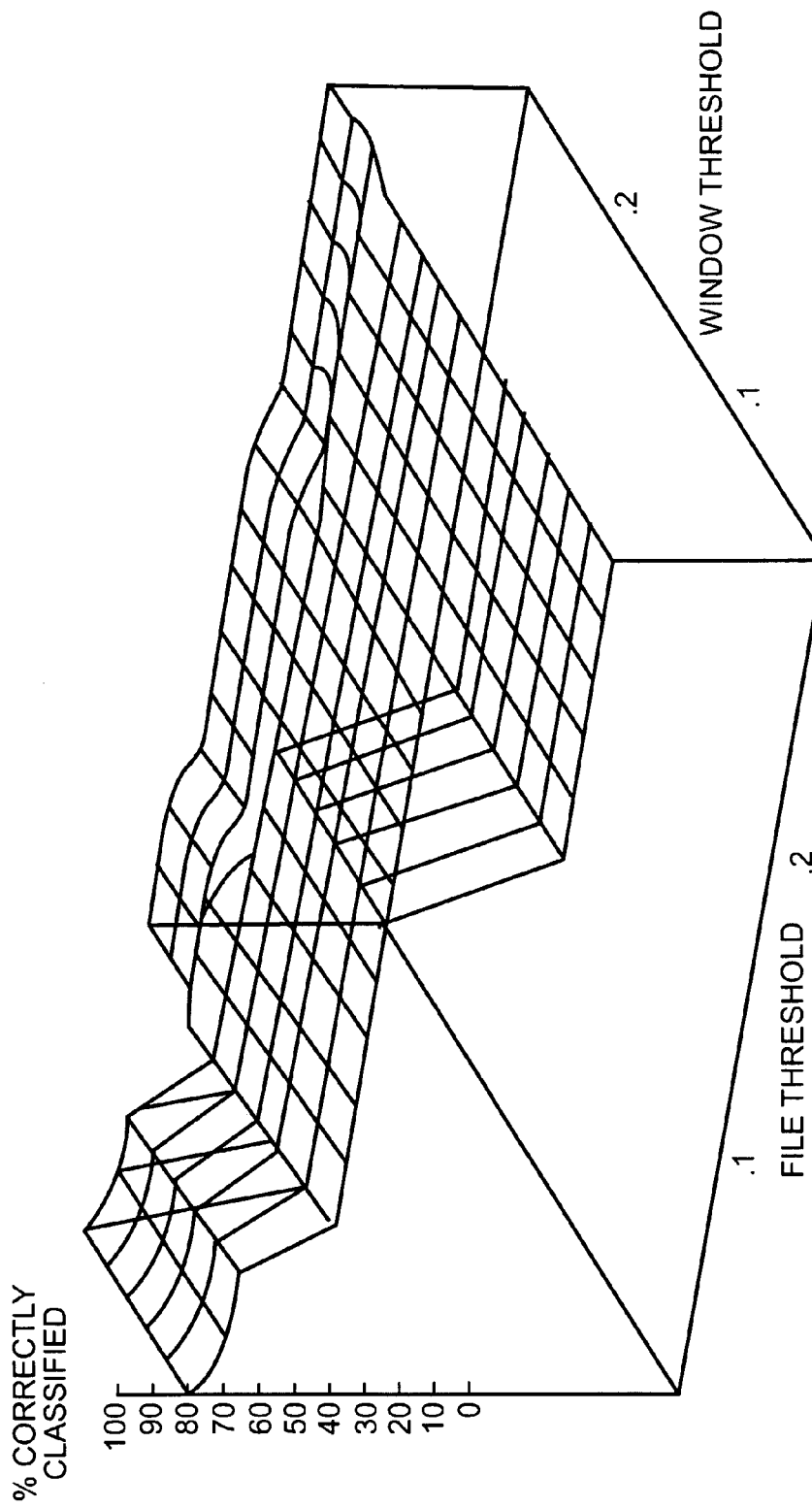

Each of the thresholds, segment and data string sizes described above may be adjusted to get varying performance results from the IDS. For example to optimize the segment and session thresholds, the performance of the IDS is measured against these two variables while using a fixed data string size and a fixed segment size. An example of such a plot is shown in FIGS. 1A and 1B. For the IDS plotted in FIGS. 1A and 1B, the optimal values for the segment and application threshold are both about 0.1. The optimal data string and segment sizes can be similarly determined by plotting the performance of the IDS under varying data string and segment sizes, with fixed segment and session thresholds. The results of these analyses will vary for the particular operating systems and operating environments in which the IDS is implemented. For a Solaris operating system, the preferred data string size is six, and the preferred segment size is twenty.

B. IDS Using Neural Networks in Combination with Temporal Locality Algorithm

This aspect of the present invention also comprises two phases: the training and selection phase; and the application monitoring phase. In the training and selection phase, multiple embodiments a neural network are trained using appropriate audit data, and the best performing network is selected for use in the application monitoring phase. The phases are described in more detail below.

Neural Network Training and Selection Phase

The neural network training and selection phase of the present invention involves encoding the data used for input into the network, and training the numerous test networks to identify the best network topology for a given set of training data. As discussed above, the training data used for training and selecting the neural networks may be collected using the auditing facilities inherent in the operating system. Also as noted, other data collecting applications may be used to identify the operating characteristics of the application. Because the present invention may be used for both anomaly detection and for misuse detection, the data collected should include both normal and malicious operations of the application to be monitored. Moreover, the data should be labeled so that behavior learned by the neural network is correctly identified. The amount of training data collected is dependent upon the nature of the application being monitored. The primary limitation on the amount of training data collected is the system resources consumed in gathering the data. In some instances, the application may experience an extensive variety of system calls during its "normal" operations. In these cases, a longer period of data collection may be necessary, for example, three or four weeks worth of data may be collected before reaching a point of diminishing returns. On the other hand, other applications may have so few combinations of normal operation that a sufficient training data set can be compiled in a few days.

In an actual implementation of the preferred embodiment, the training data comprised a sequential listing of system calls made by the application to be monitored having been collected over a period of four weeks. During this four week period, both normal and malicious operations were recorded and labeled as discussed above. The collected data was divided into two sets: one set was used or training the neural networks and the other set was used for testing the validity of the neural networks and for selecting the best performing network. The testing data should be different than data that was used in the training phase. Accordingly, when collecting data in the initial steps, enough data for training and testing should be collected.

Figure 2:
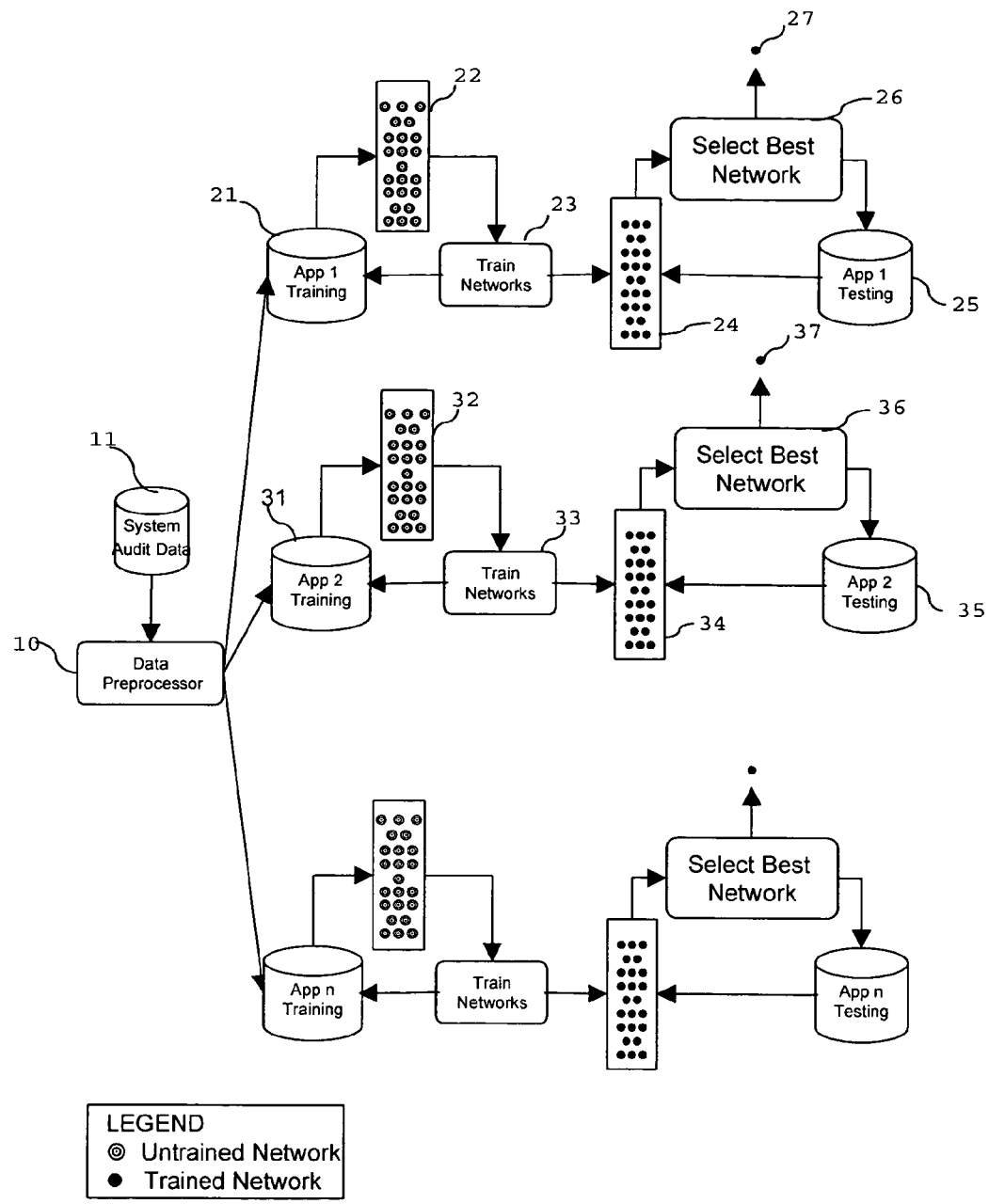
FIG. 2 is a schematic diagram showing how application monitors are trained in a preferred embodiment of the present invention.

Because most standard auditing facilities can collect data for numerous concurrent sessions, a data preprocessor may be used to prepare the data for training. As shown in FIG. 2, data pre-processor 10 receives raw data from audit database 11. Audit database 11 comprises audit data collected during operation of many different applications, over many different sessions. Data preprocessor 10 separates the data into a different data file for each application to be monitored (e.g., training data files 21 and 31), as shown in FIG. 2. Additionally, data preprocessor 10 generates data testing files such as test files 26 and 36. Although the data is consolidated according to the application executed, the data within each file is grouped according to individual sessions. Retaining a session identification allows the IDS of the present invention to classify a session rather than a single invocation of an application, as explained in more detail in the section describing the application monitoring phase, below.

In the preferred embodiment, the neural network comprises a feed-forward backpropogation network and the data is encoded using a distance metric taking into account the events common to two strings, as well as the difference in positions of common events. Accordingly, the distance metric is used to measure the distance from the data string to each of several "exemplar" strings. The distance metrics, such as implemented in the present invention, is commonly referred to in the art as a Levenshtein edit distance, as described, for example, in "An Overview of Sequence Comparison Algorithms in Molecular Biology," Eugene Myers, University of Arizona Technical Report No. TR-91-29, 1991, which is incorporated herein by reference in its entirety.

In this embodiment, the backprop neural network topology has an input layer, a hidden layer and an output layer. During the training and selection phase, several parameters should be tested to determine the best performing neural network. For example, the number of input and output nodes and the number of nodes in the hidden layer should be determined. The number of input nodes used in the neural network depends on the number of exemplar strings, since each exemplar string yields a different distance for input into the network. A single output node is used in a preferred embodiment of the present invention. In this embodiment, the more anomalous the input is, the closer to 1.0 the network computes its output. Conversely, the closer to normal the input is, the closer to 0.0, the output node computes.

The number of hidden nodes for the neural networks is determined as part of the selection process. That is, several different networks with several different hidden nodes are trained using the training data sets described above. In an actual implementation of this embodiment, networks having 10, 15, 20, 25, 30, 35, 40, 50, and 60 hidden nodes were trained for each application to be monitored. Moreover, in this implementation ten different sets of initial weights were used for each network topology tested. Accordingly, for each application to be monitored, 90 different neural networks (nine topologies, with ten different initialization settings) were initialized.

The neural networks were trained in an iterative process of exposing training data to the network; performing the well-known backprop algorithm to adjust the weights, checking the total number of errors made, and repeating the process. The backprop algorithm is described in more detail in "Neural Networks for Pattern Recognition," Christopher Bishop, Clarendon Press/Oxford University Press, Oxford, 1995 pp 140–148, which is incorporated by reference herein in its entirety. For each network trained, the process was continually repeated until the total error made from one iteration to the next stopped decreasing (i.e., the network stopped learning), or until 1,000 iterations had been run.

As shown in FIG. 2, the training data associated with each application is fed into the plurality of initialized networks created for each application. For example, training data 21 is fed into plurality of untrained networks 22 and training data 31 is fed into plurality of untrained networks 32, to train a plurality of neural networks for applications 1 and 2, respectively. In training steps 23 and 24, the weights are adjusted after each iteration to better teach the network. As discussed above, in each case, if a neural network has not improved its learning, or if 1,000 iterations have been performed, the training phase ends. As shown in FIG. 2, the training phase results in a plurality of trained networks (e.g., plurality of trained networks 24 and 34) associated with each application to be monitored. In a preferred embodiment, the number of trained networks in each plurality is the same as the number of initialized networks in each plurality. That is, no selection of best networks is made until the selection process described below.

As previously described, some of the data collected during both normal and malicious operation of each application is held back for use as testing data. As shown in FIG. 2, testing data 25 is applied to plurality of trained networks 24 and testing data 35 is applied to plurality of trained networks 34, for applications 1 and 2, respectively. In selection steps 26 and 36, the trained network producing the best results is selected from each plurality of trained networks. For example in FIG. 2, trained network 27 is selected from plurality of trained networks 24 because it had the highest accuracy rate in classifying the test data as normal or anomalous. Similarly, trained network 37 is selected from plurality of trained networks 34. For the anomaly detection system, the most accurate neural network would yield the lowest overall (i.e., lowest average) output when normal data is supplied and would yield the highest overall output when malicious testing data is supplied. Conversely, for the misuse detection system, the highest output value corresponds to a match or near match of malicious behavior, whereas normal behavior should result in lower output values in the neural network.

Application Monitoring Phase

After the neural networks have been trained and selected for each application to be monitored the IDS is ready for use in the application monitoring phase. In this phase, application audit data is captured and analyzed in real-time, i.e., it is processed as it is produced, or as soon thereafter as possible. As described in the previous section, the audit data may be fed into a data preprocessor for separating the data according to the applications being monitored. The data pre-processor collects this data, separates each monitored application's data into distinct application data streams and converts each data stream into the representation for that particular application's monitor. These data streams represent an execution trace for each monitored application, and are also referred to herein as "application data profiles." The application data profile is fed into the appropriate trained application monitor (i.e., trained neural network). Note that the same encoding for exemplar strings used to train the networks should be used for the application monitoring phase. The application monitor then processes the data and outputs an anomaly value. The anomaly value is tracked via a temporal locality identifier system described more fully in the next section. If the temporal locality identifier indicates numerous anomalies accumulated over a short period of time, then the session is labeled intrusive. If not, the operation continues without notice.

For anomaly detection purposes, the neural network may be trained to learn normal behavior for a particular application to be monitored. The trained network is then used to detect possibly intrusive behavior by identifying significant anomalies, i.e., concentrated differences between the application's normal operating behavior and the behavior observed. Similarly, for misuse detection purposes, the neural network may be trained to learn the behavior of applications under attack. In this aspect, the monitored application behavior is applied to the trained neural network to identify significant similarities between the observed behavior and the known malicious behavior. The neural networks can generalize from past observed behavior to recognize similar future behavior. Accordingly, the IDS of the present invention can recognize both novel and known attacks.

C. IDS Using Time Series Prediction in Combination with Temporal Locality Algorithm The preferred embodiment of the present invention may be implemented using any suitable system for predicting events in a time series. In an actual implementation of the preferred embodiment, a recurrent neural network was used as described below. One of ordinary skill in the art could implement the present invention using any one of a number of time series prediction system, including, e.g., Bayesian networks, other artificial neural networks, finite automata, and the like. This aspect of the present invention also comprises two phases: the training and selection phase; and the application monitoring phase. In the training and selection phase, multiple embodiments of the time series prediction system are trained using appropriate audit data, and the best performing system is selected for use in the application monitoring phase. The phases are described in more detail below.

Time Series Prediction Training and Selection Phase

Figure 3:
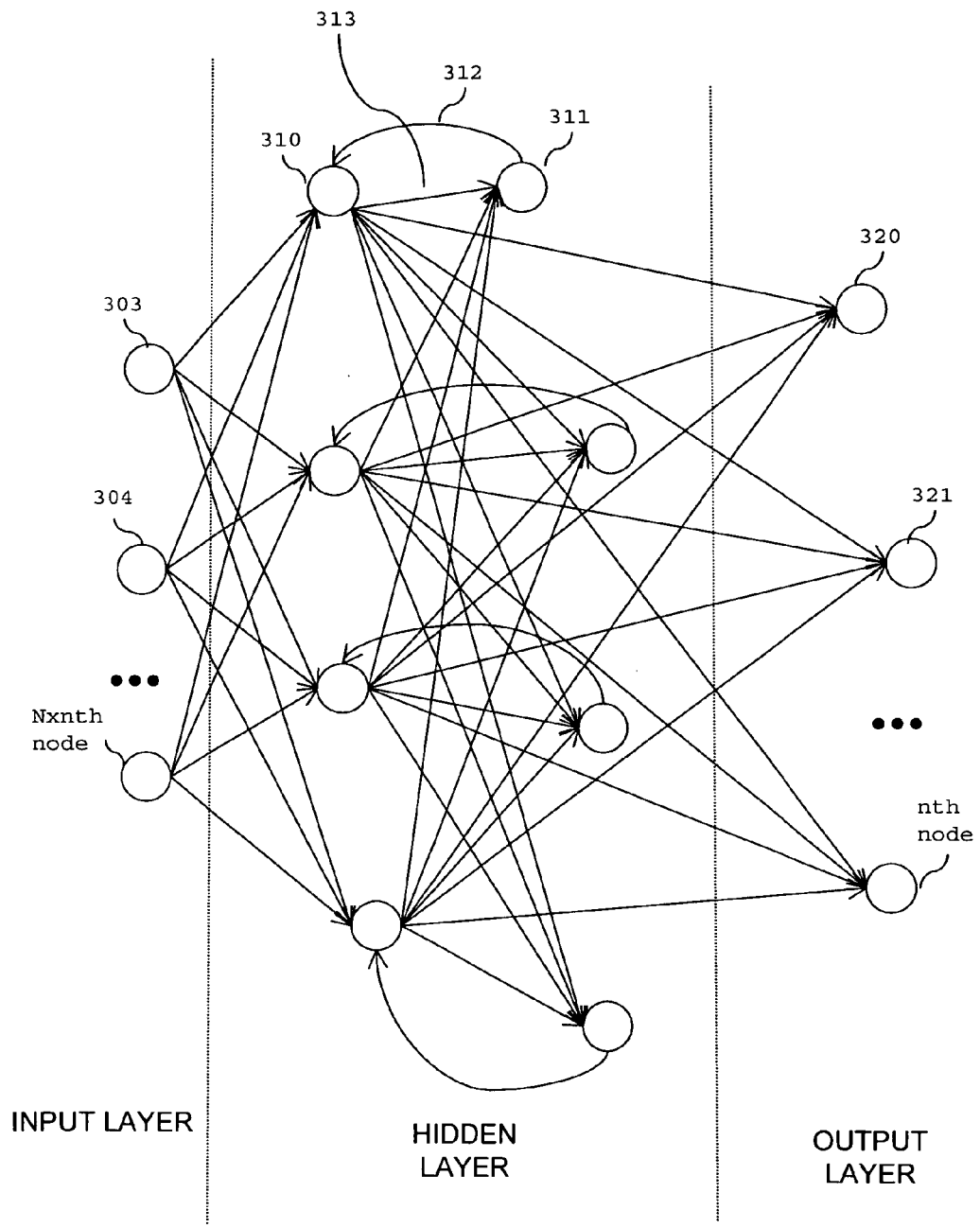
FIG. 3 is a schematic diagram of a recurrent neural network used in an embodiment of the second aspect of the present invention.

In the actual implementation of the preferred embodiment, a recurrent neural network was used in combination with a temporal locality identifier to provide an improved system and method for anomaly detection based on application monitoring. In this implementation, the neural network comprised an input layer, a single hidden layer, an output layer, and a plurality of context nodes, as shown in FIG. 3. The number of input nodes (e.g., input nodes 303 and 304) depends on the data encoding scheme used to encode the audit data collected for each session. In this implementation, each system instruction that the particular operating system allowed was assigned an integer value. Then, each integer value was further mapped to a randomly selected number comprising n bits. The audit collected was parsed using a preprocessor as described above. The data is then fed into the neural network, N events at a time. Accordingly, the number of input nodes, was N×n, wherein each node represents a single bit (0 or 1), and the first n nodes comprise a single captured event, the next n bits comprise the next captured event, and so on. In the actual implementation described herein, it was found that the best results were achieved for n=20 and N=6, however, as would be apparent to one skilled in the art, the nature of the program and the operating system may yield different results.

The hidden layer comprises a plurality of hidden nodes (e.g., hidden node 310) and a plurality of context nodes (e.g., context node 311). As shown in FIG. 3, each hidden node receives input from each input node and from one of the context nodes. Each hidden node provides input to the output nodes (e.g., output nodes 320 and 321) in the output layer, as shown in FIG. 3. A fixed weight is assigned to each of the links feeding from a context node to its associated hidden node. For example, link 312 links context node 311 to hidden node 310 and has a fixed weight. In contrast, all of the other links, such as links from the input nodes to the hidden nodes, links from the hidden nodes into the context nodes (e.g., link 313) and links from the hidden nodes into the output nodes have weights adjusted during the network training phase.

As shown in FIG. 3, the number of output nodes is equal to the number of bits used to encode the data events, i.e., n bits are used. The output of the recurrent network shown in FIG. 3 comprises n bits representing the predicted next event in the time series of data. That is, given the input of N events, the output is the next event. A "sliding window" is used to input the data events. That is, after the first N events are fed into the network, the first event fed in is dropped and the next event is fed in together with the remaining data previously fed in. Accordingly, each piece of data is used N times as input to the neural network.

The training phase encompasses feeding the audit data into the neural network and comparing the output at each step with the actual next event in the times series. The adjustable weights for each link are adjusted according to well-known recurrent neural network training techniques. As with the backprop network, several recurrent neural networks are trained, and the best performing network for each application is selected.

Application Monitoring Phase

Figure 4:
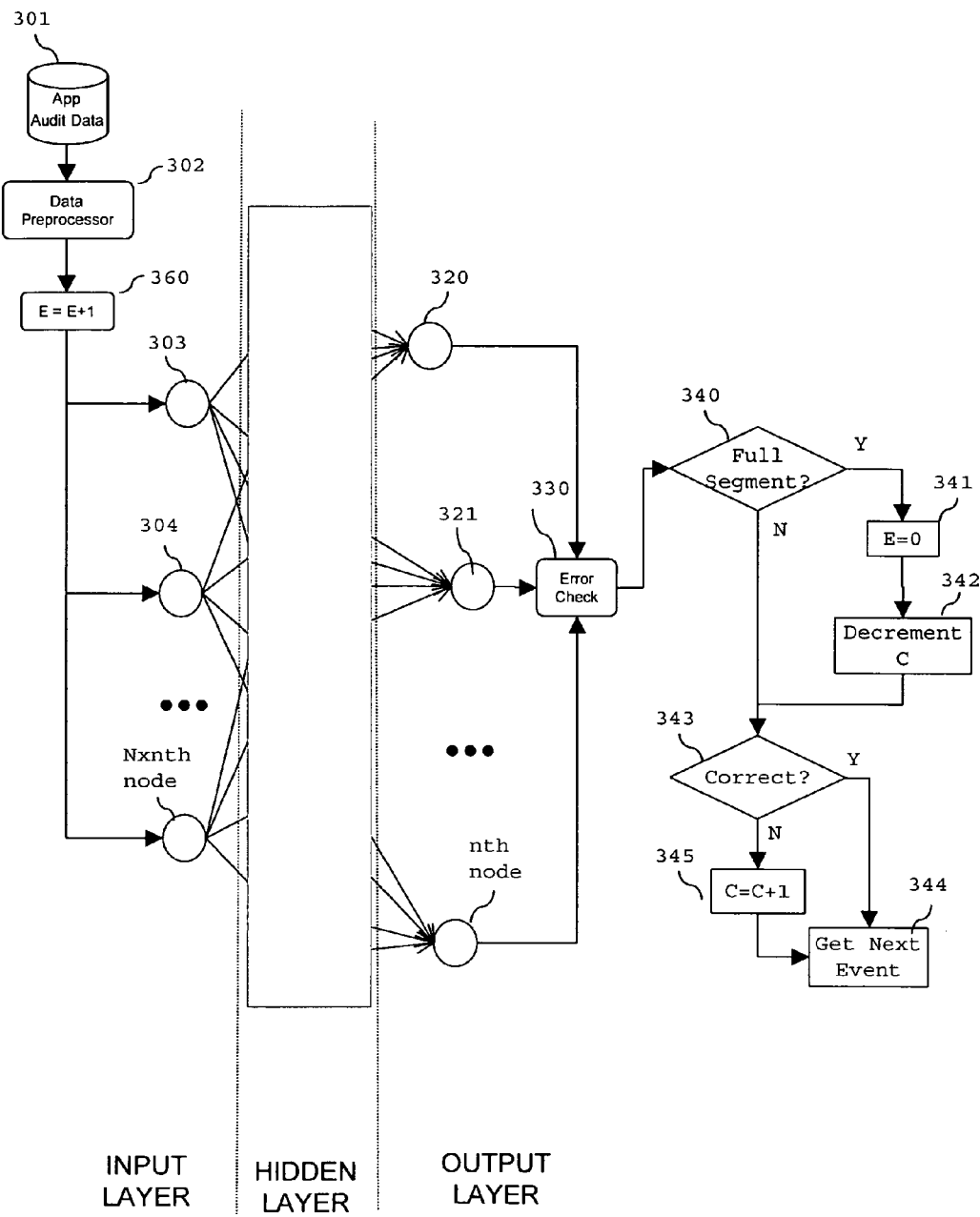
FIG. 4 is a schematic diagram showing the program flow in an preferred embodiment of the present invention using a recurrent neural network for the time series prediction algorithm and a tracking queue for the temporal locality identifier.

In this embodiment, the application monitoring phase is similar to that described above for the neural networks. That is, data is collected during a session on the host computer. The data may be collected using an audit program or other suitable means, and may be collected in real-time, or on a time-delayed basis. The data is parsed using a data preprocessor to separate the data events (i.e., system calls, object requests, etc.) according to application and pid. FIG. 4 shows the application monitoring phase for a single application. As shown in FIG. 4, application audit data 301 is provided to data preprocessor 302 for parsing the data stream into a sequential listing of events for each pid. Data preprocessor 302 further maps the events according to the same bit mapping used to encode the input data for training the network. That is, each event is mapped into n bits. Then, N events, so mapped, are fed into the recurrent neural network, via input nodes (e.g., input nodes 303 and 304). The output nodes represent the next event predicted by the recurrent neural network. As shown in FIG. 4, the output bits are provided to error check routine 330 which compares the predicted event with the actual next event in the series. error check routine 330 determines how different the predicted value is from the actual value. If the values are too different, an anomaly is detected.

In one implementation, the difference between the predicted event and the actual event is calculated as follows:

sum=0;

for each of the n output nodes (i being the current output node):

$d\_i$=the difference between the activation of the ith output node and the value of the ith bit in the audit event, $v\_i$=$d\_i$ squared, sum=sum+v_i
end of loop;
calculate the square-root of sum.

That is, the square-root of sum is the error the neural-network made in predicting the next audit event. This error then has the expected error subtracted from it. The expected error is the average error obtained for audit data coming from a given program when the original training data is applied to the neural network again. in this implementation, there was no absolute value or squaring, so the result could be negative. The resulting error value is placed at the end of queue 350, which is a queue having size y. In an actual embodiment of the present invention, the queue size, y was 10. The first score in the queue is discarded. All of the scores in the queue are averaged to calculate an anomaly score for the particular audit event predicted by the neural network. The score for an application is the maximum of all the scores obtained for the audit events produced by that application, and the score for a session is the maximum score over all programs.

Figure 5:
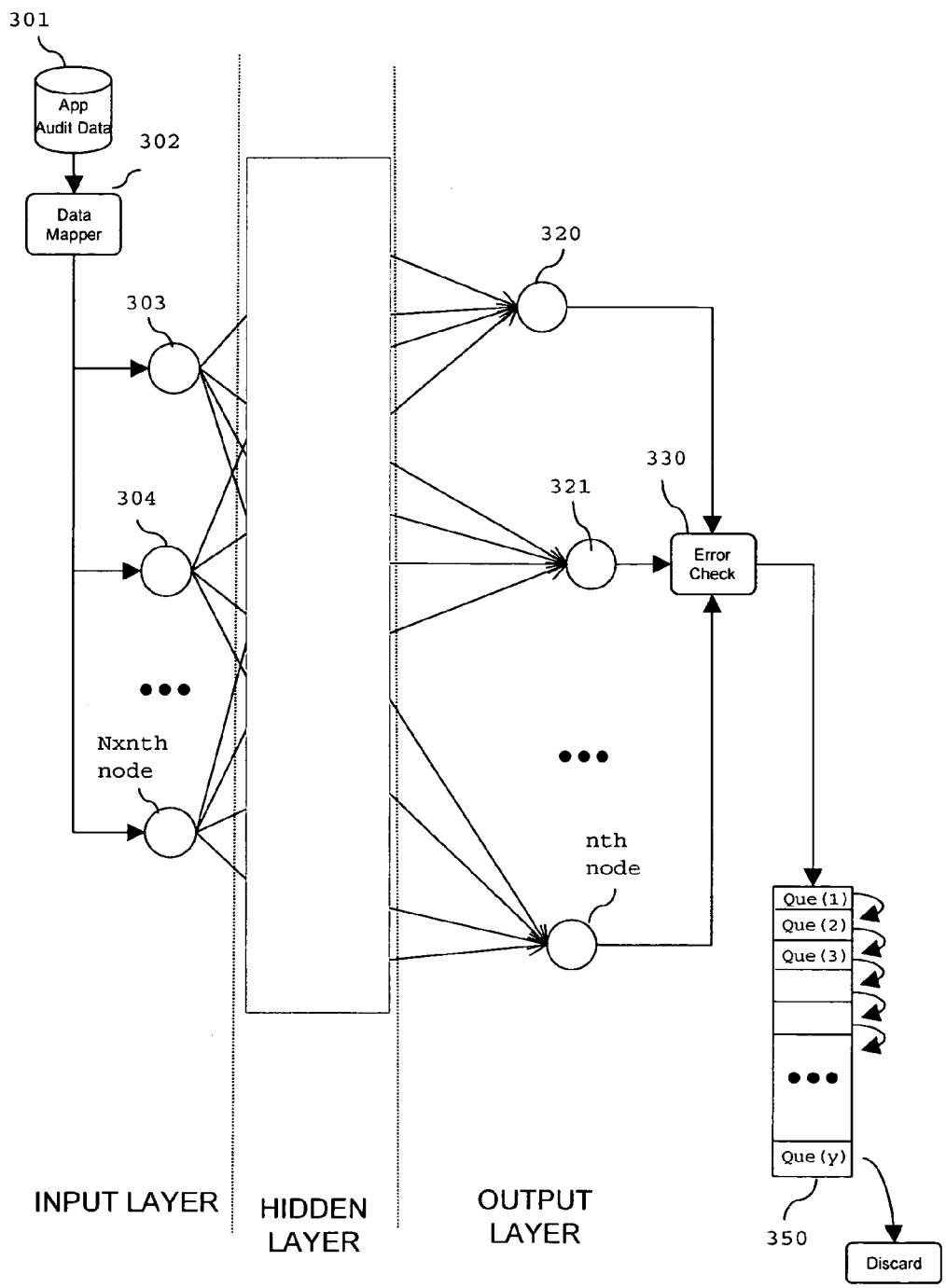
FIG. 5 is a schematic diagram showing the program flow in an preferred embodiment of the present invention using a recurrent neural network for the time series prediction algorithm and a "leaky bucket" for the temporal locality identifier.

In another embodiment, shown in FIG. 5, the temporal locality algorithm counts the number of anomalous or misuse behaviors encountered over time and slowly decrements the counter, thereby numerous encountered behaviors have a greater weight in the counter process. As shown in FIG. 5, event counter 360 is used to track the number of events fed into the neural network. After each prediction is made, error check 330 tests the prediction against the actual next event in the data and determines whether or not the event represents an anomaly. In step 340, the event counter is checked to see if a full segment of data has been processed. A segment is a pre-determined number of events. If the pre-determined number of events have been processed, the event counter is reset to zero in step 341, and the anomaly counter C is decremented by a pre-determined amount in step 342. If a full segment has not yet been processed, step 343 determines if the predicted value was correct. If the predicted value was correct, in step 344 the next event is retrieved from application audit data 301. If the predicted value was not correct, an anomaly is recorded by incrementing the anomaly counter in step 345, and the process moves on to step 344 where the next event is processed.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A detection system for detecting intrusive behavior in a session on a computer during an application monitoring phase, said session comprising a plurality of applications invoked on said computer, and said computer having a computer operating system, said detection system comprising:
    (a) a plurality of trained neural networks, wherein each trained neural network has previously been trained during a training phase to identify a pre-determined behavior pattern for a corresponding one of the plurality of applications, and wherein each trained neural network is selected for use in the application monitoring phase based upon performance during a testing phase and based upon a machine learning algorithm, wherein the machine learning algorithm employs a string distance metric, other than string matching, for preprocessing its inputs during learning, wherein a string is defined as a sequence of symbols and the string distance metric is based on at least one of events common to two strings and the difference in positions of common events, and the string distance metric is used to measure the distance from an input string to each of several exemplar strings;
    (b) a plurality of application profiles, wherein each application profile comprises a plurality of application data for a corresponding one of the plurality of applications, wherein said application data is collected during the session;
    (c) a temporal locality identifier, wherein when one of the plurality of application profiles is sequentially input to a corresponding one of the plurality of trained neural networks the trained neural network outputs a behavior indicator for each of the plurality of data strings in the application profile; and wherein if the behavior indicator meets a pre-determined criteria, a counter is incremented, and wherein if the counter has a high rate of increase the temporal locality identifier labels the application behavior intrusive, and wherein if a predetermined percentage of application behaviors are intrusive the session behavior is labeled intrusive.

2. The detection system of claim 1, wherein the pre-determined behavior pattern comprises a non-intrusive behavior.

3. The detection system of claim 1, wherein the application data comprises a distance between a sequential mapping of system calls made by a corresponding one of the plurality of applications and a pre-defined string of system calls.

4. The detection system of claim 1, wherein the application data comprises a distance between a sequential mapping of object requests made by a corresponding one of the plurality of applications and a pre-defined string of object requests.

5. The detection system of claim 1, wherein the plurality of application profiles is created by a data pre-processor application.

6. The detection system of claim 5, wherein the data pre-processor receives input from an auditing system integral to the computer operating system.

7. The detection system of claim 5, wherein the data pre-processor creates the plurality of second application profiles in real-time.

8. The detection system of claim 5, wherein the plurality of trained neural networks receive input from the plurality of application profiles in real-time.

9. The detection system of claim 1, wherein the plurality of trained neural networks comprises a plurality of backpropagation neural networks.

10. The detection system of claim 9, wherein each backpropagation neural network in the plurality of backpropagation neural networks comprises an input layer, a hidden layer and an output layer.

11. The detection system of claim 10, wherein a number of nodes in the hidden layer is determined by testing a plurality of cases for each backpropagation neural network in the plurality of backpropagation neural networks and selecting the backpropagation neural network having a highest accuracy rate during the testing phase for use in application monitoring.

12. The detection system of claim 1, wherein the plurality of trained neural networks comprises a plurality of recurrent neural networks.

13. A method for detecting intrusive behavior in a session on a computer during an application monitoring phase, said session comprising a plurality of applications invoked on said computer, and said computer having a computer operating system, said method comprising the steps of:
- (a) training a plurality of neural networks during a training phase, wherein each neural network is trained to identify a pre-determined behavior pattern for a corresponding one of the plurality of applications;
- (b) selecting for use one or more trained neural networks based upon performance during a testing phase and based upon a machine learning algorithm, wherein the machine learning algorithm employs a string distance metric, other than string matching, for preprocessing its inputs during learning, wherein a string is defined as a sequence of symbols and the string distance metric is based on at least one of events common to two strings and the difference in positions of common events, and the string distance metric is used to measure the distance from an input string to each of several exemplar strings;
- (c) creating a plurality of application profiles, wherein each application profile comprises a plurality of application data for a corresponding one of the plurality of applications, wherein said application data is collected during the session;
- (d) performing a temporal locality identifying algorithm, wherein when one of the plurality of application profiles is sequentially input to a corresponding one of the plurality of trained neural networks the trained neural network outputs a behavior indicator for each of the plurality of data strings in the application profile, and wherein if the behavior indicator meets a pre-determined criteria, a counter is incremented, and wherein if the counter has a high rate of increase the temporal locality identifier labels the application behavior intrusive, and wherein if a predetermined percentage of application behaviors are intrusive the session behavior is labeled intrusive.

14. The method of claim 13, wherein the pre-determined behavior pattern comprises a non-intrusive behavior.

15. The method of claim 13, wherein the application data comprises a distance between a sequential mapping of system calls made by a corresponding one of the plurality of applications and a pre-defined string of system calls.

16. The method of claim 13, wherein the application data comprises a distance between a sequential mapping of object requests made by a corresponding one of the plurality of applications and a pre-defined string of object requests.

17. The method of claim 13, wherein the plurality of application profiles is created by a data pre-processor application.

18. The method of claim 17, wherein the data pre-processor receives input from an auditing system integral to the computer operating system.

19. The method of claim 17, wherein the data pre-processor creates the plurality of second application profiles in real-time.

20. The method of claim 17, wherein the plurality of trained neural networks receive input from the plurality of application profiles in real-time.

21. The method of claim 13, wherein the plurality of trained neural networks comprises a plurality of backpropogation neural networks.

22. The method of claim 13, wherein each backpropagation neural network in the plurality of backpropagation neural networks comprises an input layer, a hidden layer and an output layer.

23. The method of claim 22, wherein a number of nodes in the hidden layer is determined by testing a plurality of cases for each backpropagation neural network in the plurality of backpropagation neural networks and selecting the case wherein the corresponding neural network has a highest accuracy rate.

24. The method of claim 13, wherein the plurality of trained neural networks comprises a plurality of recurrent neural networks.

* * * * *